United States Patent
Chen (10) Patent No.: US 8,930,704 B2
(45) Date of Patent: Jan. 6, 2015

(54) DIGITAL SIGNATURE METHOD AND SYSTEM

(75) Inventor: Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 13/443,285

(22) Filed: Apr. 10, 2012

(65) Prior Publication Data

US 2012/0278628 A1   Nov. 1, 2012

(30) Foreign Application Priority Data

Apr. 26, 2011   (GB) .................................. 1106932.5

(51) Int. Cl.
| | | |
|---|---|---|
| H04L 9/32 | (2006.01) | |
| G06F 21/62 | (2013.01) | |
| G06F 21/64 | (2013.01) | |
| H04L 9/08 | (2006.01) | |
| H04L 29/06 | (2006.01) | |

(52) U.S. Cl.
CPC ............ *G06F 21/6254* (2013.01); *G06F 21/64* (2013.01); *H04L 9/0863* (2013.01); *H04L 9/3247* (2013.01); *H04L 63/0853* (2013.01); H04L 63/0823 (2013.01)
USPC ......................................... 713/176; 713/182

(58) Field of Classification Search
CPC .... H04L 9/3236; H04L 9/3247; H04L 9/3281
USPC ................................. 713/176, 181
See application file for complete search history.

(56) References Cited

U.S. PATENT DOCUMENTS

| | | | |
|---|---|---|---|
| 4,405,829 A | 9/1983 | Rivest et al. | |
| 6,226,383 B1 | 5/2001 | Jablon | |
| 7,047,405 B2 | 5/2006 | Mauro | |
| 7,451,147 B1 | 11/2008 | Kao et al. | |
| 7,522,723 B1 | 4/2009 | Shaik | |
| 7,526,651 B2 | 4/2009 | Modiano | |
| 7,571,324 B2 | 8/2009 | Canard | |
| 8,225,090 B2 * | 7/2012 | You et al. ...................... | 713/161 |

(Continued)

FOREIGN PATENT DOCUMENTS

| | | | | |
|---|---|---|---|---|
| WO | WO01/01627 | | 1/2001 | |
| WO | WO 01/01627 A2 * | | 1/2001 | ................ H04L 9/08 |
| WO | WO01/95545 | | 12/2001 | |
| WO | WO2011007697 | | 1/2011 | |

OTHER PUBLICATIONS

Rivers et al., How to leak a sercret, Jun. 2001(13 pages).*

(Continued)

*Primary Examiner* — Fikremariam A Yalew
(74) *Attorney, Agent, or Firm* — EIP Partnership LLP; Matthew Lawman (57) ABSTRACT

A digital signature method, a method for initializing a digital signature scheme, a system for digitally signing a message and a computer program product are described. At least the digital signature method involves a signer having a weak security parameter. The signer retrieves a cryptographic element from each of a plurality of computing entities. Each cryptographic element is a function of a commitment supplied by the signer and the commitment includes a cryptographic function of a weak security parameter provided by the signer. A strong cryptographic security parameter is generated using a plurality of said elements. A message is then signed according to the digital signature scheme using the strong cryptographic security parameter to generate a digital signature.

17 Claims, 6 Drawing Sheets

(56) References Cited

U.S. PATENT DOCUMENTS

| | | | |
|---|---|---|---|
| 8,464,058 B1 * | 6/2013 | Chen et al. | 713/171 |
| 2001/0055388 A1 * | 12/2001 | Kaliski, Jr. | 380/30 |
| 2002/0194478 A1 | 12/2002 | MacKenzie | |
| 2003/0163698 A1 | 8/2003 | Kim | |
| 2008/0270790 A1 * | 10/2008 | Brickell et al. | 713/158 |
| 2009/0210716 A1 * | 8/2009 | Chen | 713/176 |
| 2010/0082973 A1 | 4/2010 | Brickell | |
| 2010/0169650 A1 | 7/2010 | Brickell | |

OTHER PUBLICATIONS

Office Action dated Apr. 5, 2012, U.S. Appl. No. 12/258,736, filed Oct. 27, 2008.

C.P. Schnorr, "Efficient Signature Generation by Smart Cards", Journal of Cryptology, vol. 4, No. 3, pp. 161-174, Mar. 1991 (22 pages).

Diffie, et al, "New Directions in Cryptography" (Jun. 1976) (12 pages).

T. Wu, "The SRP Authentication and Key Exchange System", The Internet Society (2000) (8 pages).

Whitfield Diffie and Martin E. Hellman, "Privacy and Authentication: An Introduction to Cryptography", Proceedings of the IEEE, vol. 67, No. 3, Mar. 1979 (32 pages).

U.S. Office Action dated Oct. 7, 2011, U.S. Appl. No. 12/258,736, filed Oct. 27, 2008, pp. 1-7 and attachments.

Brickell "Direct Anonymous attestation" Proceedings of the 11th ACM Conference on Computer Communications Security, pp. 132-145, ACM Press, 2004.

Chaum "Group Signature" Advances in Cryptology, EUROCRYPT '91, LNCS 547, pp. 552-565, Springer-Verlag, 1991.

Rabin "How to exchange secrets by oblivious transfer", Technical Report TR-81, Aiken Computation Laboratory, Harvard University, 1981 (26 pages).

Mihir Bellare et al., Foundations of Group Signatures: Formal Denfitions, Simplied Requirements, and a Construction Based on General Assumptions, May 2003 (27 pages).

Dan Boneh, Short Group Signatures, 2004 (20 pages).

Ford, Server-Assisted Generation of a Strong Secret from a Password, IEEE, 2000 (5 pages).

David Jablon, IEEE P1363.2: Password-based Cryptography CTO, Phoenix Technologies, NIST PKI TWG—Jul. 30, 2003 (23 pages).

International Standard ISO/IEC 11770-4 First edition May 1, 2006 Information technology—Security techniques—Key management—Part 4: Mechanisms based on weak secrets (38 pages).

Moni Naor et al., Oblivious Transfer with Adaptive Queries, Dept. Of Computer Science and Applied Mathematics, 1999 (18 pages).

Rivest et al., How to Leak a Secret, Jun. 2001 (13 pages).

www.incits.org—ISO/IEC 14888-3:1998, Information Technology—Security Techniques—Digital Signatures with Appendix—Part 3: Certificate-based mechanisms (1 page).

GB Search Report for GB Patent Application No. 1106932.5, UK Patent Office issued on Aug. 12, 2011 (2 pages).

Liqun Chen et al., U.S. Appl. No. 12/258,736 entitled Password-Based Cryptographic Method and Apparatus filed Oct. 27, 2008 (39 pages).

* cited by examiner

DIGITAL SIGNATURE METHOD AND SYSTEM

BACKGROUND

In the field of computing there is often a need to prove an identity of a user. For example, a user may need to electronically sign a contract, to make an online payment, to contribute an electronic vote, to access a network service, and so on. Digital signatures are one way in which a user may prove his or her identity. A digitally signed message or document can be verified as originating from a particular individual or group of individuals.

To generate the digital signature a user typically requires a smart-card and reader or other suitably-adapted electronic device to hold a private signing key. However, in certain situations a user may not have access to a smart card or electronic device; for example, they may be on holiday, they may be away from a home or office, or they may not be able to safely carry additional items. There is thus a need for a user to be able to electronically identify themselves in these situations.

DETAILED DESCRIPTION

An exemplary method and system solve at least a problem of requiring a smart-card and reader or other suitably-adapted electronic device for digitally signing a message or document by generating and/or storing a strong cryptographic parameter for use in a digital signature scheme from a weak security parameter; for example, from a password that may be memorised by a user. Implementations make use of a plurality of computing entities, such as a plurality of remote servers, to return elements of the strong cryptographic parameter without compromising a user's weak security parameter; for example, returning key portions that may be used in a key derivation function to generate a secret key. Using the methods described herein, a computing entity cannot access a user's weak security parameter, nor can they individually provide information that allows a malicious third party to derive the weak security parameter. The described method and system thus at least provide a secure and robust method suitable for use over untrusted networks such as the Internet.

An exemplary digital signature method according to an implementation will now be described.

Figure 1:
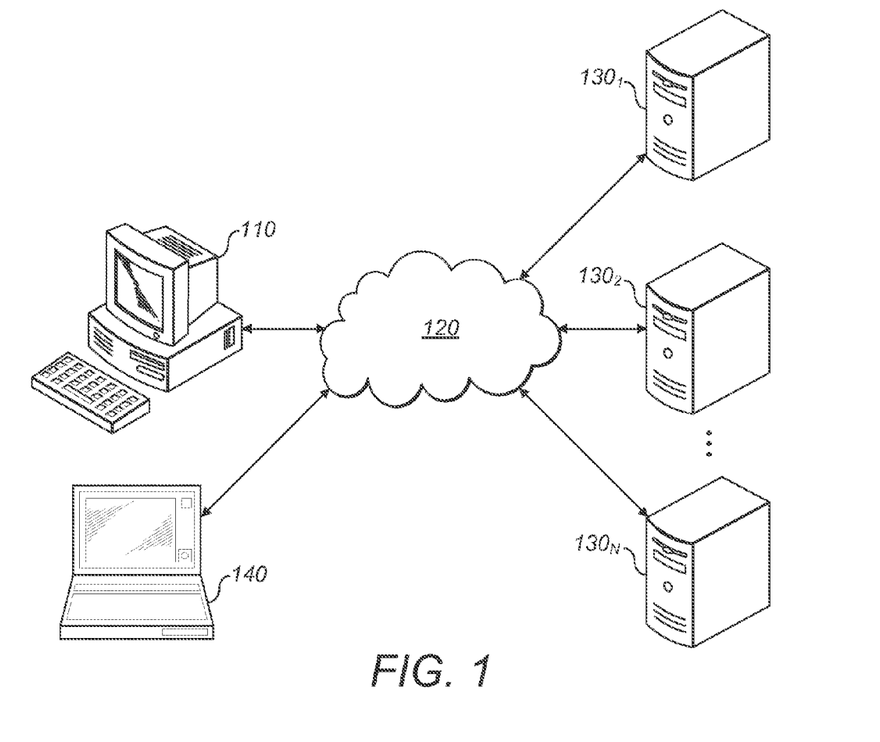
FIG. 1 is a block diagram that shows an exemplary network.

FIG. 1 shows a number of computing entities 110, 130, 140 that are communicatively coupled over one or more networks 120. In the present description "network" refers to any form of communication channel that enables one entity to communicate with one or more other entities. The network may comprise multiple wired or wireless networks including routers, gateways, sub-nets etc. FIG. 1 shows a signing entity 110 and a verifying entity 140. A user utilises signing entity 110 to digitally sign a document or message that may be electronically verified by verifying entity 140. Examples of the signing entity 110 are described later with regard to FIG. 6. The user and/or the signing entity 110 are referred to herein as "the signer S" and a user of verifying entity 140 and/or verifying entity 140 are referred to herein as "the verifier V". Computing entities 130 are accessible by the signer S. In one embodiment, each computing entity 130 may comprise a service provider SP, e.g. one or more servers that provide a service to a user on request. Thus computing entities 130 comprise a plurality of service providers $SP_{1...N}$. Communications between the entities, for example those described below, may be direct or indirect and may be across one or more networks with one or more intermediate devices and/or storage phases.

Figure 2:
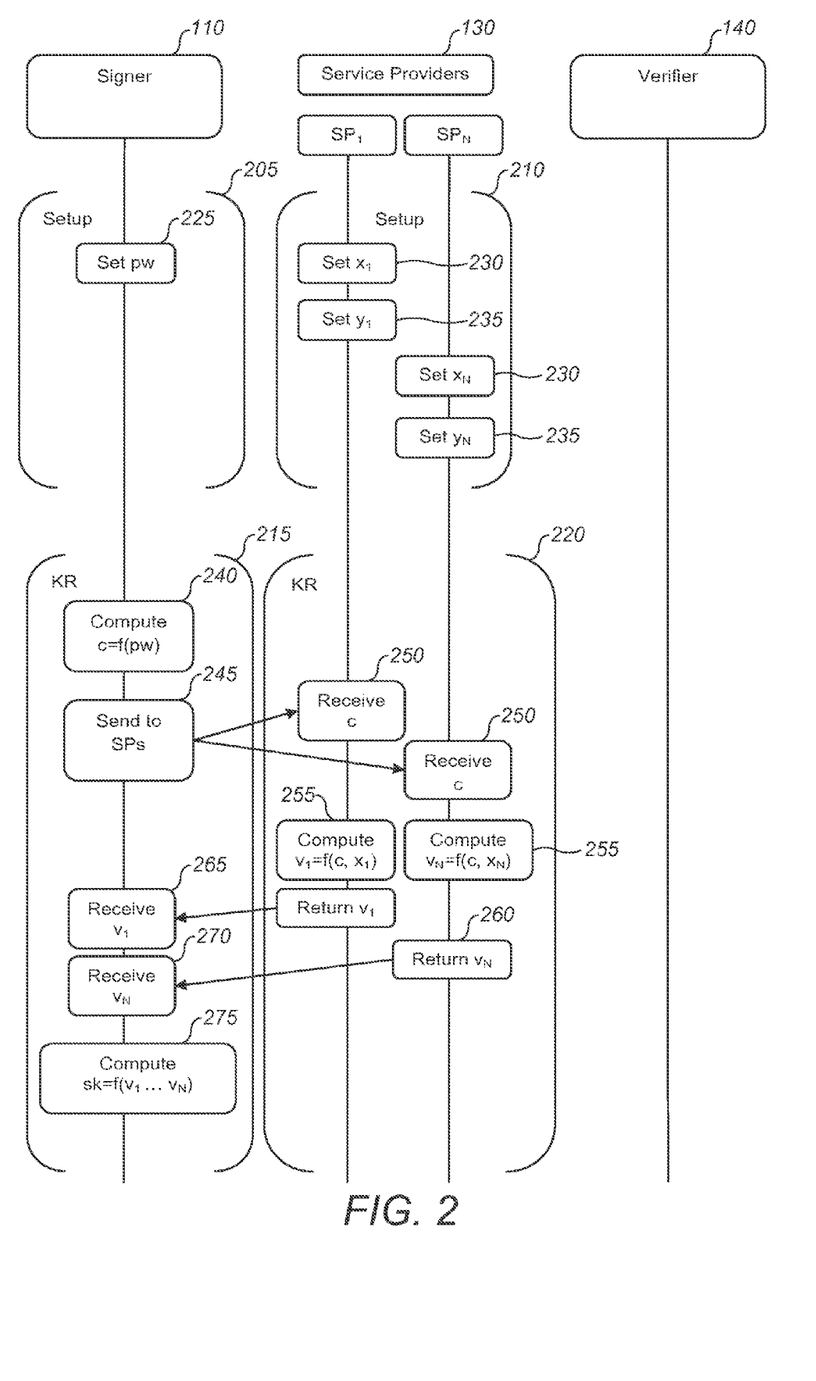
FIG. 2 is a flow diagram that shows an exemplary key retrieval method according to an implementation.

FIG. 2 illustrates an exemplary method for configuring a digital signature scheme that involves signer S and the plurality of service providers $SP_{1...N}$. The method comprises a setup phase 205 for the signer S and a setup phase 210 for each service provide $SP_i$.

At step 225 in setup phase 205 the signer S sets a weak security parameter. In the present example, the weak security parameter is a password pw. In the present context "weak" implies that the security parameter is part of a limited parameter space and as such may be correctly guessed within a moderate number of tries. For example, a password pw may form part of a password space PW. If such a password is on average around eight characters in length (l), and each of these characters has 4 bits, then an upper bound for the entropy of an exemplary password may be 32 bits. This assumes a user randomly chooses each bit; in most cases human users select known words or character combinations making the choice non-random. Hence, in most cases the entropy of a password is much less than this upper bound. Passwords of this size can be computed using a brute force attack, i.e. iterating through all possible character combinations within the password space, in the previous example a maximum of $2^{32}$ attempts would be required. As most passwords are not randomly chosen they are often susceptible to brute force and/or dictionary attacks, the latter employing a search by using a stored list of specific password values or a stored list of words from a natural language dictionary. The characters, for example, may be chosen from one or more of the groups of letters of the Latin alphabet (number of symbols: 26), Arabic numerals (number of symbols: 10) and/or printable characters (number of symbols: 94).

A weak security parameter may also be defined in relation to a strong security parameter. A strong security parameter is one that cannot feasibly be guessed. For example, according to current technology it is reasonable to assume that a 128-bit key or longer cannot be guessed using a standard digital computer. A typical elliptic curve based digital signature scheme makes use of a 256-bit length private signing key. The entropy bits of the exemplary strong key (256) are greater in number than the entropy bits of the exemplary weak password (32), i.e. length k is greater than length l. Of course, over time, and as computing power increases, the number of bits that typically exemplify both a weak and a strong password will increase beyond the numbers suggested herein; and implementations described herein should therefore not be limited to the numbers suggested herein.

In setup phase 210 cryptographic parameters for the service providers are set. This may or may not occur at the same time as setting password pw, in many implementations the two events will occur at different times, for example phase 210 may occur at separate times for each service provider when that service provider is initialised. Typically each service provider and each signer S will setup their own cryptographic parameter individually and independently. In this example, the cryptographic parameters comprise a private key, $x_i$, and a public key, $y_i$, for each service provider $SP_i$. In the present implementation, there are domain public parameters G, q, g, H and k. G is a cyclic group of the prime order q, such that the size of q is about $2^k$ where k is a security parameter; g is the generator of G; and H is a secure hash function, wherein $H:\{0,1\}^* \to G$ (i.e. the result of H is also within the cyclic group G). The private key of each service provider, $x_i$, is typically an integer ($x_i \epsilon Z_q^*$) and the public key of each service provider, $y_i$, is typically the generator of G, g, with an exponential $x_i$ ($y_i = g^{x_i} \epsilon G$). The group of service providers need not all use a common group G. In certain implementations, one or more service providers may use one or more different groups. At steps 230 and 235 the private and public keys for the first service provider are set, and this is repeated for all N service providers.

Following the setup phases for the signer S and the service providers $SP_i$, where $i=\{1, 2, \ldots, N\}$, a key retrieval phase 215, 220 is initiated. The key retrieval phase can be performed any time following the setup phase 205, 210. A comparative key retrieval scheme is that specified in standard ISO/IEC 11770-4.

At step 240 the signer S performs a function on the weak security parameter, in this case pw. In an implementation the function is a one-way cryptographic function of password, pw, and in the present implementation this function is the secure hash function H. A one-way cryptographic function such as a secure hash function may further be a function including a random integer, r, such as $c=H(pw)^r$, wherein $r \epsilon Z_q$. At step 245 the signer S sends the result of the function, which may be referred to as commitment, c, to each of the service providers $SP_i$. Each service provider $SP_i$ receives the commitment, c, at step 250 and computes a reply, $v_i$. The reply comprises a function of the commitment, c, and may comprise a function of both the commitment and a service provider's private key, $v_i = f(c, x_i)$. In the present implementation, the reply comprises an exponential function of the commitment, c, with an exponent of $x_i$, for example $v_i = c^{x_i}$. The reply may belong to the group G, i.e. $v_i \epsilon G$, or may belong to a group used by a particular service provider, i.e. $v_i \epsilon G_j$. At step 260 each service provider $SP_i$ replies to the signer S, for example by returning $v_i$ following computation. At step 265 the signer S receives a reply from the first service provider $SP_1$ and then continues to receive replies until a reply from the last service provider $SP_N$. At step 275 the signer uses each reply as an element in a function to generate a strong cryptographic parameter. In the present implementation, the strong cryptographic parameter is a secret key formed from one or more key derivation functions incorporating one or more of the replies. For example, in the present implementation, a key derivation function (KDF) may take all the replies as input to produce a strong key as an output, e.g. $sk=KDF(v_1 \ldots v_N)$. In this case the key derivation function may comprise the multiplicative sum of the elements $v_i$ raised to the power of $r^{-1}$, e.g. $(\pi^n_{i=1} v_i)^{1/r} = H(pw)^{\Sigma xi}$ for i=1 to N. In some implementations the secret key is a member of the group G. In another implementation, different key derivation functions may be used for different replies, e.g. $sk=f\{KDF_1(v_1), \ldots, KDF_N(v_N)\}$. The latter implementation may be used when service providers use public domain parameters with different groups. Different groups of key derivation function may also be used. In any case, the result of the key retrieval phase 215 is a strong cryptographic parameter that may be used by the signer S.

In one variation of the above method a public key, $y_i$, belonging to each service provider $SP_i$ is used by the signer S to verify a reply from the service provider. This improves robustness as it prevents a malicious party impersonating a service provider. In one implementation, a pairing function or bilinear map may be used based on the public key $y_i$ to verify $v_i$ is calculated correctly. The pairing function may enable a proof of the discrete logarithm equality of $y_i$ to the base g and $v_i$ to the base c. In other implementations, a service provider $SP_i$ may use a digital signature that may be verified using the public key. Alternatively, other verification routines may be used to prove the authenticity of $v_i$. A mixture of verification routines for the group of service providers may also be used, depending on the configuration of each service provider.

A key retrieval scheme according to the above implementations may prevent any of the service providers, working either individually or in a group up to N−1 entities in size, from being able to derive the value of the computed strong security parameter (sk) even with a brute force attack. This is because no one service provider has enough information concerning the weak security parameter for an attack to be successful. To prevent the group of service providers from being used together to make a brute force attack, each service provider $SP_i$ may have an auditing function wherein if the number of the key retrieval requests (such as step 245) is higher than a certain level, the service provider will reject the requests.

Figure 3:
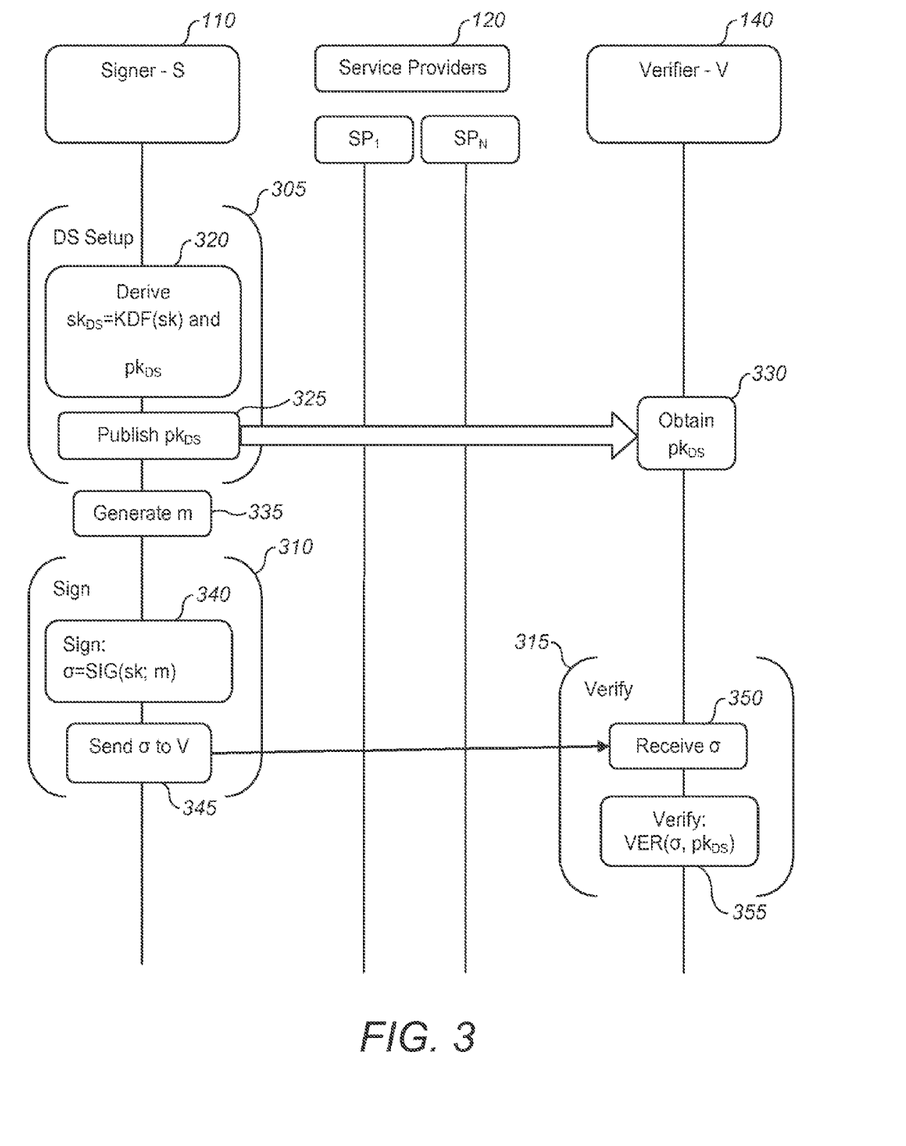
FIG. 3 is a flow diagram that shows an exemplary digital signature method according to an implementation.

FIG. 3 illustrates the use of the strong security or cryptographic parameter obtained through the exemplary key retrieval operations of FIG. 2 in an exemplary digital signature (DS) scheme. The digital signature scheme comprises setup 305, sign 310 and verify 315 phases. The digital signature scheme may comprise, for example, a Schnorr signature scheme, the Digital Signature Algorithm (DSA) defined in standard ISO/IEC 14888-3 or any other suitable digital signature scheme. In setup phase 305, a DS security parameter for the digital signature scheme is derived from the strong cryptographic parameter (e.g. sk) produced by step 275. The DS security parameter may comprise a secret key, $sk_{DS}$, that may be computed using a key derivation function, i.e. $sk_{DS}=KDF(sk)$. In other implementations the DS secret key, $sk_{DS}$, may simply equal the original secret key, sk, without an extra key derivation step. The secret key, $sk_{DS}$, may have an associated public key, $pk_{DS}$, as defined in the DS scheme. If the DS scheme uses an associated public key, $pk_{DS}$, this may be published or otherwise communicated to the verifier V at step 325. The verifier V thus obtains the public key, $pk_{DS}$, for use in verification according to the DS scheme at step 330.

At step 335 a message m is generated by the signer S. In digital signature applications, a message to be signed could be given to the signer S instead of being generated by S. The message may be a document such as a contract or letter, a transaction for use in commerce, authentication for a secure key agreement, a digital item to be exchanged with a user or any other piece of digital information. The message may, for example, be generated through dynamically generating the message content or retrieving stored data.

Following the generation of a message at step 335, a sign phase 310 is undertaken to digitally sign the message, m, using the DS security parameter generated from strong cryptographic parameter that was originally derived from the weak security parameter. At step 340 within sign phase 310 a signature algorithm according to the DS scheme is applied to the message. Typically, such an algorithm takes the form of $\sigma = SIG(sk_{DS}; m)$, wherein $\sigma$ is a signature and SIG is a signature algorithm with inputs $sk_{DS}$ and m. At step 345, the signature, $\sigma$, is sent to the verifier V by the signer S. As with the other steps of the exemplary methods described herein, step 345 can occur at any time after the previous step 340.

Following the sign phase 310 a verifier may verify the digital signature, $\sigma$, using verify phase 315. At step 350 the verifier receives the signature, $\sigma$, from the signer S. At step 355 the verifier V applies a verification algorithm, VER. In the present example, the verification algorithm, VER, uses the public key, $pk_{DS}$, of the signer S such that VER takes as input the signature and the public key, i.e. $VER(\sigma, pk_{DS})$. The output of the verification algorithm is typically a binary output indicating whether the signature has been verified. If the signature is verified the signer S and the verifier V may continue with further communications, the verifier V having confirmation of the identity of the signer S, because $pk_{DS}$ is cryptographically bound with the identity of the signer. It is well-known that such a cryptographic bounding between the public verification key and the signer's identity, such as the signer's name, can be achieved by using a public key certificate, which is available to the verifier V as well as the key per se.

An outcome of the above exemplary digital signature scheme is that individually none of the service providers $SP_i$ nor verifier V can forge a digital signature of the signer S or make a brute-force attack to determine the weak security parameter. This is important; typically a digital signature, $\sigma$, is accessible to malicious third parties who can use it, together with any public key, $pk_{DS}$, and message information, m, as information to attempt to calculate the weak security parameter. A service provider $SP_i$ may also be a verifier V, in which case they will also have access to commitment, c. With the exemplary methods described, no one party, even one acting as both service provider and verifier has access to sufficient information to derive the weak security parameter.

The implementations described herein may be counter-intuitive to one skilled in the art of cryptography. Digital signatures must be universally verifiable, i.e. any party should be able to verify a digital signature they receive. This means that a signature, message and any associated public key may be accessible to anyone, including malicious third parties. A signer S cannot trust a verifier V. This has lead to strong cryptographic parameters being held by the signer, for example on a smart card or within a digital device, wherein the security of the strong cryptographic parameter is achieved through physically securing the smart card or device. Comparatively, use of passwords has been limited to cases where there can be trust between a user and the entity receiving a password of the user. For example, in a client-server interaction, the server may be trusted and thus may have access to a password or a function of a password, i.e. the parties operate in a symmetric manner (each party has access to information concerning the password). Security in these cases is achieved by limiting physical access to the server and ensuring the server is trustworthy. In practice, security is improved if the number of servers is limited (ideally to one). Hence, there are conflicting requirements for digital signatures and passwords that make their combined use surprising. By using a digital signature scheme configured as described above a user need only remember a password yet be able to universally verify his or her identity.

The implementations described herein further have advantages over other password-based schemes. Passwords per se are vulnerable to a brute-force attack or a dictionary attack. The brute-force attack employs an exhaustive search of whole space of passwords and the dictionary attack employs a search by using a stored list of specific password values or a stored list of words from a natural language dictionary. If, similar to password-based encryption, a private signing key is simply derived from a password or a password with a public salt (i.e. random bits that are added to the password), these private signing keys, and signature schemes based on the use of these keys, are vulnerable to these two attacks.

In another example, a digital signature scheme may be adapted to provide an anonymous digital signature. In an anonymous signature scheme, a verifier can validate a signature but cannot determine the signer's identity from the signature. Rather than using an individual public key in verification, the verifier can either use multiple public keys, such as ring signatures, or use a group public key, such as group signatures or Direct Anonymous Attestation (DAA). An exemplary description of ring signatures is provided in R. Rivest, A. Shamir and Y. Tauman: *How to leak a secret* from Advances in Cryptology—ASIACRYPT '01, LNCS 2248, 552-565, Springer-Verlag, 2001; an exemplary description of group signatures is given in D. Chaum and E. van Heyst: *Group signatures* from Advances in Cryptology—EUROCRYPT '91, LNCS 547, 257-265, Springer-Verlag, 1991; and an exemplary DAA scheme is described by E. Brickell, J. Camenisch and L. Chen in *Direct anonymous attestation* from the Proceedings of the 11th ACM Conference on Computer and Communications Security, 132-145, ACM Press, 2004. In both a group signature scheme and a DAA scheme, each legitimate group member obtains a group member credential corresponding to his or her private signing key such that the verifier is not able to find out which group member is the signer.

Figure 4:
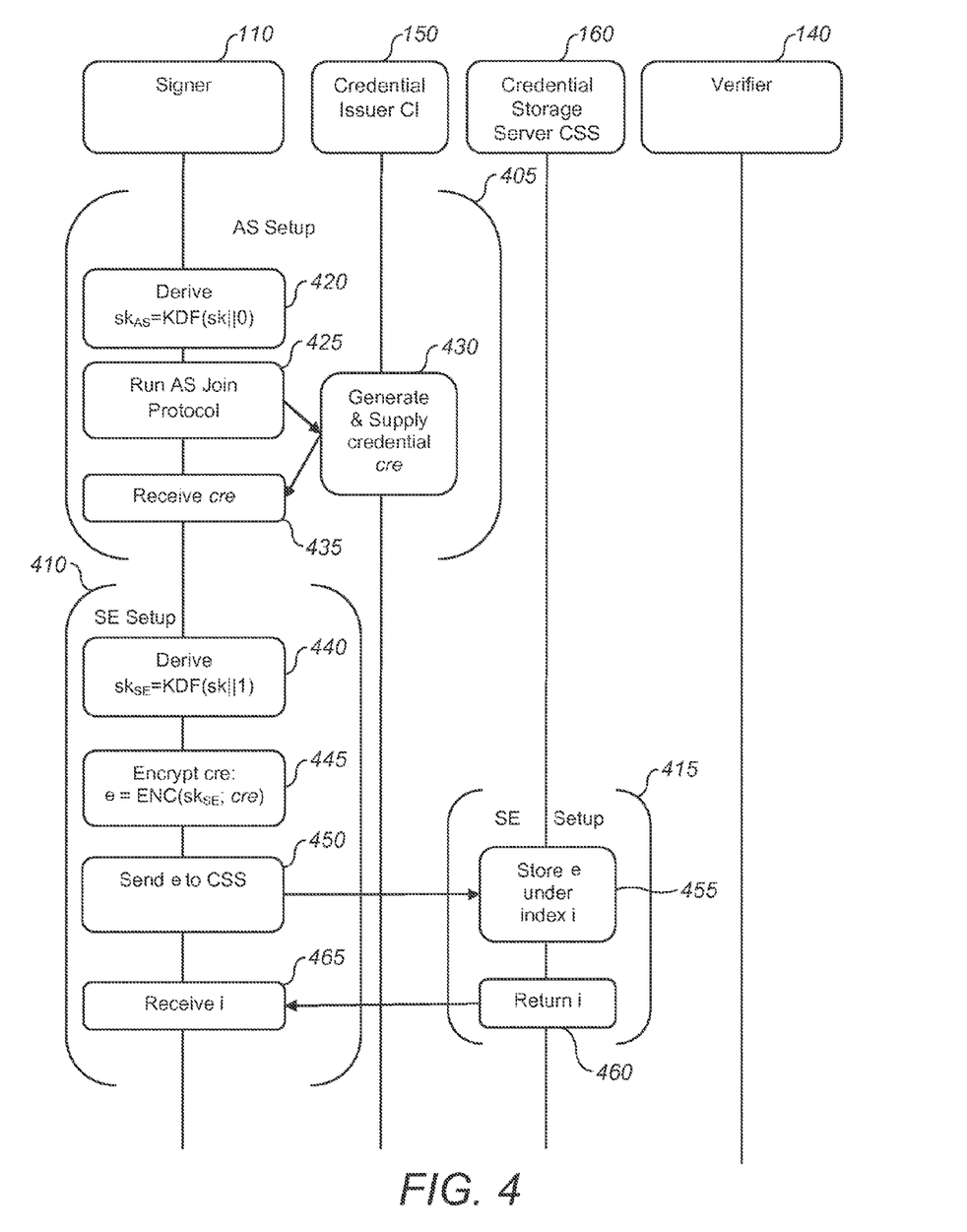
FIG. 4 is a flow diagram that shows an exemplary method of configuring entities for use in an anonymous digital signature method according to an implementation.
Figure 5:
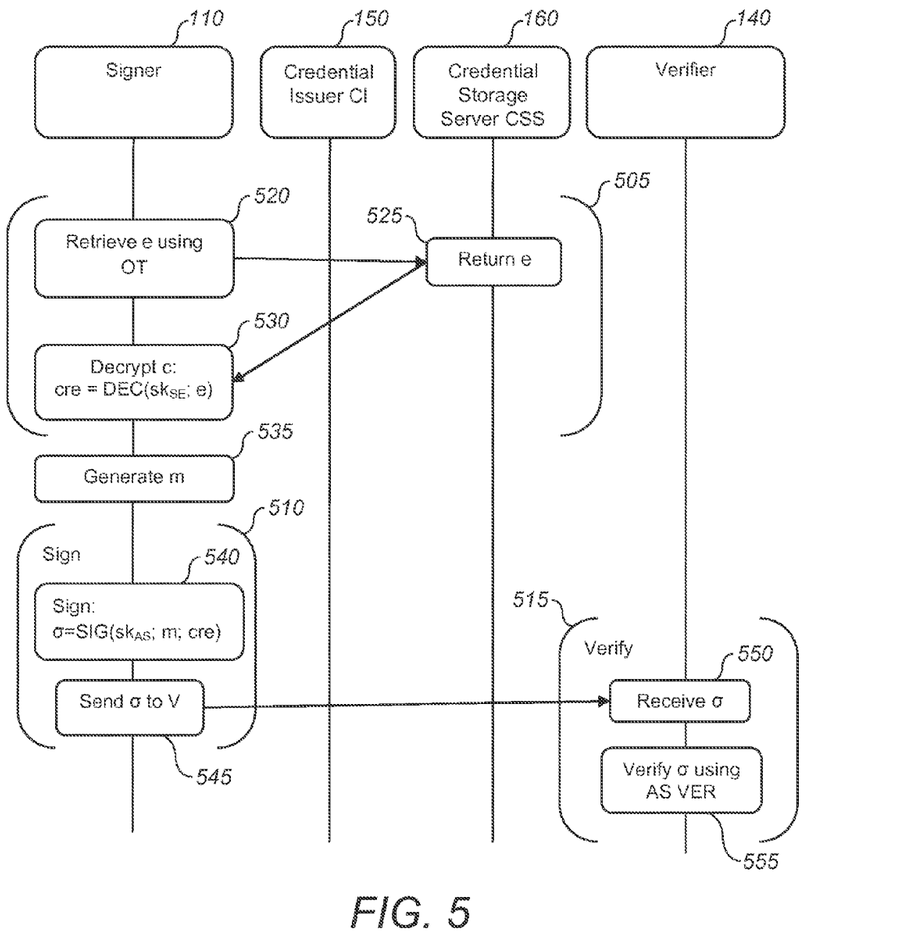
FIG. 5 is a flow diagram that shows an exemplary anonymous digital signature method according to an implementation.

To provide anonymous digital signatures using a ring signature, the DS scheme described above in relation to FIG. 3 may be replaced with a ring signature scheme. When a group public key is used a group member credential may be stored in a local or remote location (to signing entity 110) such that the signer can reliably retrieve it. In cases where the signer S does not have its own locally-accessible storage capability, for example in the form of a smart card or other suitably-adapted electronic device, a group member credential may be retrieved from a remote location. In some schemes, this group member credential must be kept secret in order to guarantee anonymity of the signer. FIGS. 4 and 5 illustrate an exemplary method for providing an anonymous digital signature scheme that overcomes the requirement to keep the group member credential secret.

The exemplary method of FIGS. 4 and 5 involves two additional entities: a credential issuer 150 (I) and a credential storage server 160 (CSS). The signer S further forms part of a group of two or more signers. Certain implementations also make use of a tracing manager (T—not shown).

The exemplary method of FIGS. 4 and 5 assumes that a key retrieval operation, such as that shown in FIG. 2, has been completed to derive a strong cryptographic parameter, for example: secret key—sk, from a weak security parameter such as password pw. FIG. 4 shows a setup phase 405 for an anonymous signature (AS) scheme. At step 420, an AS security parameter for the AS scheme is derived from the strong cryptographic parameter (e.g. sk) produced by step 275. The AS security parameter may comprise a secret key, $sk_{AS}$, that may be computed by the signer S using a first key derivation function, i.e. $sk_{AS} = KDF(sk\|0)$. In other implementations the AS secret key, $sk_{AS}$, may simply equal the original secret key, sk, without an extra key derivation step. At step 425 the signer initiates a join protocol defined by the AS scheme. Both the group signature scheme and the DAA scheme have known join protocols. The join protocol involves communication with the credential issuer I to obtain a credential cre. The credential, cre, may be used as a group credential for the AS scheme. At step 435 the group credential is received by the signer from the credential issuer I.

Following the supply of a credential, there is a phase 410 to configure a symmetric encryption (SE) scheme (SE={ENC/DEC}). The symmetric encryption scheme is used to encrypt the credential for storage with the credential storage server CSS. At step 440 a secret key, $sk_{SE}$, for the symmetric encryption scheme may be derived from the strong cryptographic parameter, sk, using a second key derivation function $sk_{SE}=KDF(sk\|1)$. At step 445 the newly generated secret key, $sk_{SE}$, is used to encrypt the credential, cre, using the symmetric encryption scheme to produce a ciphertext e; for example $e=ENC(sk_{SE}; cre)$. At step 450 the ciphertext, e, is sent to the credential storage server CCS. At step 455 in setup phase 415 the credential storage server, CSS, stores the ciphertext, e, under an index i. At step 460 the credential storage server, CSS, returns the index, i, to the signer S, who receives and stores it at step 465. Alternatively, if the index i has a random representation, it can be computed by the signer using the strong cryptographic parameter retrieved from the weak secret, for example $i=KDF(sk\|2)$. This completes the initial steps required to initially configure the exemplary anonymous signature scheme.

FIG. 5 illustrates an exemplary method for anonymously signing a message using the parameters generated, for example, by the method of FIG. 4. The method comprises a credential retrieval phase 505, a sign phase 510 and a verify phase 515. These phases may be initiated when a signer needs to sign a document.

At step 520 of phase 505 the signer S retrieves the ciphertext, e, using an oblivious transfer (OT) scheme. Oblivious transfer technology is used to prevent a server from breaking anonymity of a signer. An oblivious transfer (OT) scheme is a known protocol run between a sender A and a receiver B. By running the protocol, A sends some information to B, but remains oblivious as to what is received. Normally B is a client and A is a server. A 1-out-of-n oblivious transfer protocol is a general OT protocol and defined as follows. A has n messages, and B has an index i indicating which message he or she wants to receive, i.e. B wishes to receive the i-th message among A's n messages, without A learning the value i, while A wants to ensure that B receives only one of the n messages. A 1-out-of-n oblivious transfer protocol was described by Michael O. Rabin in *How to exchange secrets by oblivious transfer*—Technical Report TR-81, Aiken Computation Laboratory, Harvard University, 1981. In the present example, an OT scheme is used to allow the signer S (who is the receiver B) to retrieve the ciphertext, e, from the credential storage server, CSS (who is the sender A), without revealing the index i. At step 525 the credential storage server, CSS, returns the ciphertext, e. At step 530 the signer decrypts the ciphertext, e, using the SE secret key, $sk_{SE}$, to obtain the credential, cre; $cre=DEC(sk_{SE}; e)$. In some implementations the SE secret key, $sk_{SE}$, may be dynamically re-computed from the secret key, sk; in other implementations, the secret key, $sk_{SE}$, may be locally retrieved following storage after step 440. If there is a discontinuity between phases 410 and 505, for example the steps are undertaken on different entities or using temporally separated portions of trusted memory, then the SE secret key, $sk_{SE}$, may be re-computed. The credential, cre, is thus available to the signer for use in the group signature scheme without requiring the signer to securely store the credential.

At step 535 a message m for signing is generated or retrieved. As before, the message, m, may be any item of digital data. The message, m, is signed in phase 510. At step 540 the signer S signs the message, m, using a signing algorithm defined in the anonymous signature scheme. As discussed previously, the AS secret key, may be re-computed according to $sk_{AS}=KDF(sk\|0)$ if it is not available, e.g. if there is a discontinuity between steps 540 and 420. The signing algorithm may take as input the AS secret key, $sk_{AS}$, the message, m, and the decrypted credential, cre, such that the signature comprises $\sigma=SIG(sk_{AS}; m; cre)$ as defined in the AS scheme. At step 545 the signer S sends the signature, σ, to the verifier V. Verifier V undertakes verification phase 515 in a similar manner to phase 315: at step 550 the verifier V receives the signature, σ, and at step 555 the verifier V verifies the signature, σ, by using the verification algorithm (e.g. VER) defined in the AS scheme.

In certain implementations, for example those involving a group signature scheme, tracing manager, T, may be used to open and trace the signature. In some implementations the tracing manager, T, and the credential issuer, I, may be the same entity. In DAA schemes, user-controlled-traceability may be provided, for example as described in E. Brickell, L. Chen and J. Li: *Simplified security notions for direct anonymous attestation and a concrete scheme from pairings* Int. Journal of Information Security, 8, 315-330, 2009. Credential issuer, I, and tracing manager, T, may have a public-private key pair defined by the anonymous signature scheme.

One advantage of the above-described anonymous signature scheme is that none of the servers, acting individually or without the collusion of all the servers in the group, can forge a signature, or perform a brute-force attack. This includes the key retrieval servers such as the service providers, the group member credential issuer, the group tracing manager, and the credential storage server.

The exemplary methods described above provide, for example, a password-based signature scheme and a password-based anonymous signature scheme. Password-based signatures and password-based anonymous signatures allow users to benefit from digital signatures and anonymous digital signatures without requiring a strong private signing key. In a scheme that uses a group credential, the group credential may be used along with a computed private key to sign a message.

The exemplary digital signature (DS) and anonymous signature (AS) schemes described herein may be replaced by different types of key-based digital signatures. For example, password-based concurrent signatures, password-based designated verifier signatures, password-based ring signatures, password-based group signatures, password-based DAA, etc. can all be provided using the teachings set out above. Additionally, many other digital signature based cryptographic mechanisms can make use of said teachings; for example, light-weight fair-exchange mechanisms based on passwords may be provided as well as efficient cross domain key exchange based on passwords. For example, two entities may each share a password with a respective server and require a password-authenticated key exchange. Solutions provided or suggested in the art have often been cryptographically broken and many lack efficiency. Using a secure password-based signature scheme, a secure key agreement scheme may be constructed as long as two entities from different domains hold an authentic copy of each other's public key. Another important application of a password-based signature scheme is that two users can fairly exchange their digital signatures based on their memorable passwords, rather than a strong secret key. This makes a fair exchange solution more convenient and efficient.

Both the key retrieval servers (e.g. service providers $SP_i$) and the credential storage server CSS may be semi-trusted.

By this it is meant that they are not completely trusted by their users; for example, they are not assumed to never have motivation of forging a user's signature, making a brute-force attack to a user's password or breaking anonymity of its users. This may hold true if a server is compromised by a malicious third party. The described implementations operate successfully with semi-trusted servers.

Some exemplary implementations of the signing entity 110, which enable a user to undertake the methods described above, will now be discussed. In certain circumstances a user may not have access to a trusted computing device. For example, they may be in a foreign location and only have access to an untrusted terminal such as a hot-desk or public Internet device. In these cases, the exemplary apparatus illustrated in FIG. 6 may be used.

Figure 6:
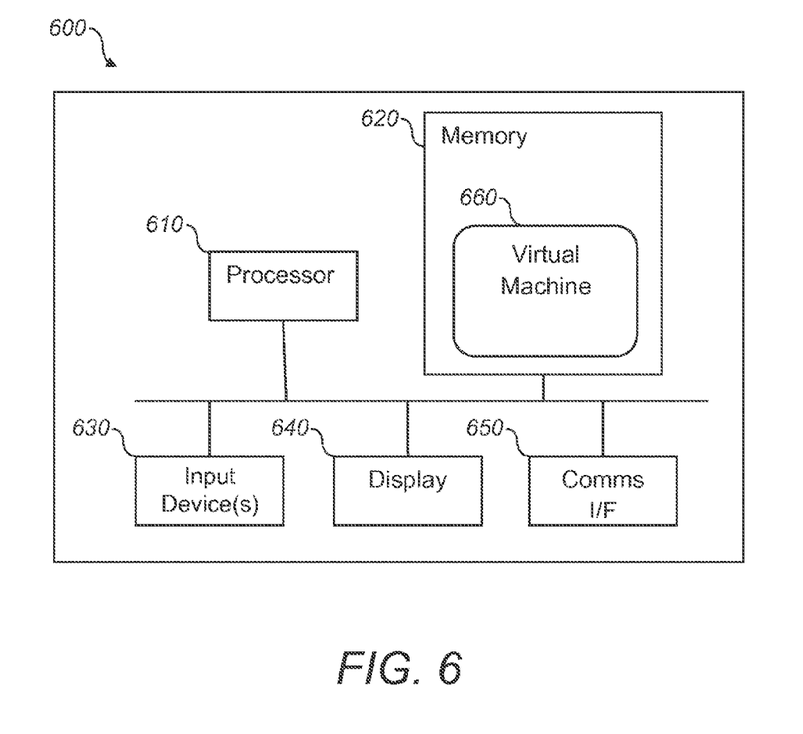
FIG. 6 is a functional block diagram that shows an exemplary trusted entity according to an implementation.

Apparatus 600 of FIG. 6 comprises a computing entity having, amongst other elements, a processor 610, memory 620, one or more input devices 630, a display 640 and a communications interface 650. To implement the core of the computing entity only processor 610 and memory 620 are needed. Apparatus 600 may be a computing terminal accessible by the public. The one or more input devices 630, which may comprise a mouse, keyboard, touchscreen etc, and the display 640 enable a user to interact with the apparatus 600, e.g. to enter data and receive feedback via the display.

As the apparatus 600 may be accessible by the public and is assumed to be untrusted, a user cannot normally enter their weak security parameter, for example their password, without fear of interception. However, in order to implement the digital signature schemes described above a commitment based on the weak security parameter must be sent to the plurality of service providers. One way to overcome this problem is to use a virtual machine 660. A virtual machine 660 may be defined as an emulation of a physical machine that is implemented by computer program code stored in memory 620 and processed by processor 610. In certain implementations, the virtual machine 660 may provide an application virtual machine wherein data entered via input devices 630 and data used to render display 640 is not accessible to other processes running within memory 620. In other implementations, the virtual machine 660 may provide a virtual operating platform, such as an operating system, on top of an existing operating system kernel layer. As with the application virtual machine, the virtual operating platform may encapsulate all process run within it such that an underlying operating system kernel layer, or applications operating upon said kernel layer, do not have access to the data processed by the virtual operating system, such as data sent to and from the input-output devices 630, 640 and 650. When the virtual machine 660 is terminated all data in memory 620 and elsewhere relating to the virtual machine session may be securely deleted. Virtual machine 660 may also provide virtual drivers capable of managing input-output devices 630, 640 and 650. Communications interface 650 may be communicatively coupled to one or more networks and thus be used to sent the commitment c to the plurality of server providers, receive the result of the function performed by each service provider and send a digitally signed message to a verifier. Virtual machine 660 thus provides a trusted entity within an untrusted device that can compute the commitment, c, the secret key, sk, and the signature, $\sigma$. Multiple sessions of a virtual machine 660, e.g. distinct temporally-separated sessions, may implement different phases of the above described methods or different steps of said phases.

In other implementations a trusted platform module (TPM) may be used instead of or as well as virtual machine 660, and/or may be used to provide a key retrieval server, i.e. one or more of service providers SP.

The above implementations are to be understood as illustrative examples. Further implementations are envisaged. It is to be understood that any feature described in relation to any one implementation may be used alone, or in combination with other features described, and may also be used in combination with one or more features of any other of the implementations, or any combination of any other of the implementations. Furthermore, equivalents and modifications not described above may also be employed.

The invention claimed is:

1. A digital signature method involving a signer having a weak security parameter, the method comprising:

retrieving, by the signer that includes a processor, a cryptographic element from each of a plurality of computing entities, each of said cryptographic elements being a function of a commitment supplied by the signer and a private key of a respective one of the computing entities, said commitment comprising a cryptographic function of the weak security parameter provided by the signer, wherein said cryptographic function is a one-way function of at least the weak security parameter and a random variable;

generating, by the signer, a strong cryptographic security parameter using a plurality of said cryptographic elements; and signing, by the signer, a message according to a digital signature scheme using the strong cryptographic security parameter to generate a digital signature.

2. The digital signature method of claim 1, wherein each of the computing entities has the corresponding private key and a corresponding public key, the method further comprising:

using, by the signer, the public key of the corresponding computing entity to verify a correctness of the cryptographic element retrieved from the corresponding computing entity.

3. The digital signature method of claim 1, wherein the strong cryptographic security parameter comprises a secret key and generating the strong cryptographic security parameter comprises one of:

computing the secret key using a key derivation function of the plurality of retrieved cryptographic elements; or computing a plurality of contributions to the secret key, each of the contributions using a key derivation function of a respective retrieved cryptographic element, and computing the secret key as a function of the plurality of contributions to the secret key.

4. The digital signature method of claim 1, wherein the signer belongs to a set of signers and the digital signature scheme comprises a ring signature scheme to provide an anonymous digital signature, wherein signing the message comprises signing the message using a private key derived from the strong cryptographic security parameter and public keys belonging to the set of signers.

5. The digital signature method of claim 1, wherein the digital signature scheme uses a group credential to provide an anonymous digital signature, the method further comprising:

obtaining a credential from a credential issuer based on an anonymous signature scheme that uses a first secret key computed from the strong cryptographic security parameter.

6. The digital signature method of claim 5, wherein the method further comprises:

encrypting the credential based on a symmetric encryption scheme that uses a second secret key computed from the strong cryptographic security parameter to generate a ciphertext;

storing the ciphertext with a credential storage server, the ciphertext being identified by an index, wherein the ciphertext is retrievable from the credential storage server using an oblivious transfer scheme, the oblivious transfer scheme enabling the signer to retrieve the ciphertext without revealing the index.

7. The digital signature method of claim 6, further comprising computing, by the signer, the index using the strong cryptographic security parameter retrieved based on the weak secret parameter.

8. The method of claim 1, wherein the method comprises part of one or more of: a password-based concurrent signature scheme, a password-based fair exchange scheme, a signature-based password-authenticated key agreement, a password-based designated verifier signature, a password-based ring signature scheme, a password-based group signature scheme, and a password-based direct anonymous attestation scheme.

9. The method of claim 1, wherein a verifier is able to verify the digital signature using the digital signature scheme.

10. The digital signature method of claim 1, wherein the one-way function is a one-way secure hash function.

11. A method for initializing a digital signature scheme involving a signer having a weak security parameter, the method comprising: receiving, by a computing entity including a processor, a commitment from the signer, said commitment comprising a cryptographic function that is a one-way function of at least the weak security parameter and a random variable; computing, by the computing entity, an element of a strong cryptographic security parameter as a function of the commitment and a private key of the computing entity; sending, by the computing entity, said element to the signer to cause the signer to derive the strong cryptographic security parameter from said element and one or more further elements received from one or more other computing entities, said strong cryptographic security parameter being useable in the digital signature scheme to sign a message.

12. A system for digitally signing a message comprising: a trusted entity comprising a processor and arranged to receive a weak security parameter and compute a strong cryptographic security parameter, said trusted entity being communicatively coupled to a plurality of computing entities and arranged to: transmit a commitment comprising a cryptographic function that is a one-way function of at least the weak security parameter and a random variable to each of the plurality of computing entities; receive, from each of the computing entities in response to the transmitted commitment, an element of the strong cryptographic security parameter, the element being a function of the commitment and a private key of a corresponding one of the computing entities; derive a strong cryptographic security parameter from said received elements for use in a digital signature scheme; and sign a message according to the digital signature scheme to generate a digital signature.

13. The system of claim 12, wherein the trusted entity comprises a temporary virtual machine executed in memory by a processor, wherein knowledge of the weak security parameter is confined to the temporary virtual machine.

14. The system of claim 12, wherein the trusted entity is configured to further verify a correctness of each of the received elements using a public key of the corresponding computing entity.

15. The system of claim 12, wherein the cryptographic function is a secure hash function.

16. The system of claim 12, wherein each of the received elements is an exponential function of the commitment and the private key of the corresponding computing entity.

17. A computer program product comprising a non-transitory computer-readable storage medium storing computer program code executable by a signer having a processor to:

receive cryptographic elements from a plurality of computing entities, each of said cryptographic elements being a function of a commitment supplied by the signer and a private key of a respective one of the computing entities, said commitment comprising a cryptographic function that is a function of at least a weak security parameter provided by the signer and a random variable;

generate a strong cryptographic security parameter using a plurality of said cryptographic elements; and sign a message according to a digital signature scheme using the strong cryptographic security parameter to generate a digital signature.

\* \* \* \* \*